Oct. 3, 1933.  R. P. LANSING  1,929,372
ELECTRICAL APPARATUS
Filed May 12, 1928   3 Sheets-Sheet 1
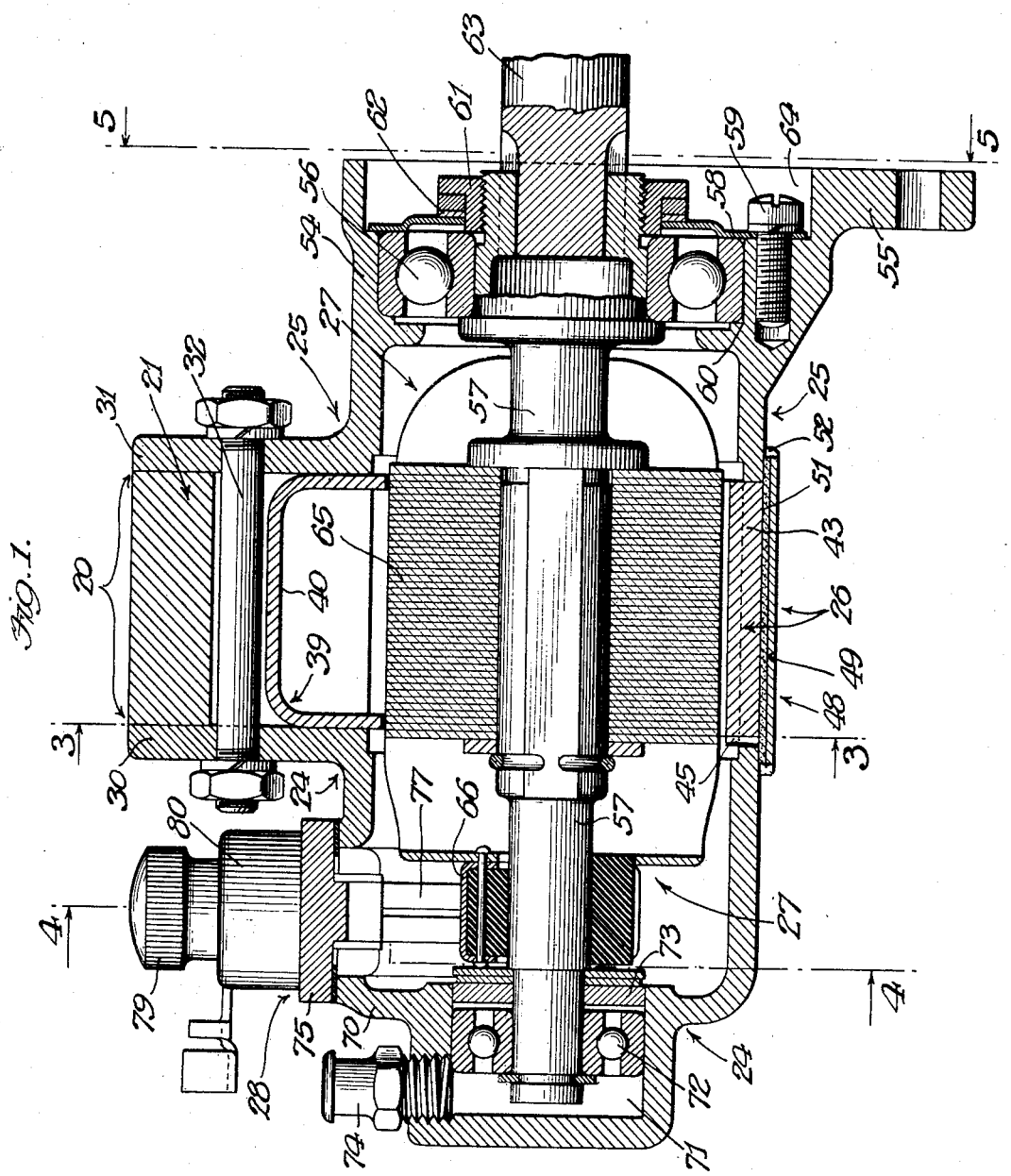
Witness
Martin H. Olsen.
Inventor
Raymond P. Lansing
By Rector Hibben Davis Macauley
Attys Oct. 3, 1933.  R. P. LANSING  1,929,372
ELECTRICAL APPARATUS
Filed May 12, 1928  3 Sheets-Sheet 2

Witness
Martin H. Olsen

Inventor
Raymond P. Lansing
By Rector Hibben Davis & Macauley
Attys.

Patented Oct. 3, 1933

1,929,372

UNITED STATES PATENT OFFICE 1,929,372

ELECTRICAL APPARATUS

Raymond P. Lansing, Montclair, N. J., assignor to Eclipse Machine Company, Elmira, N. Y., a corporation of New York Application May 12, 1928. Serial No. 277,374

19 Claims. (Cl. 171—209)

My invention relates to electrical apparatus and, in some of its aspects, more particularly to electrically operated means for indicating the speeds of aircraft engines. In the operation of airships equipped with a plurality of propelling engines it is important that the pilot shall be able to ascertain, at his station, the speed of each engine. One of the objects of my invention is to provide electrical apparatus enabling the pilot to take accurate readings at will, on a single indicating dial in the cockpit, of the respective speeds of each of the engines with which the airship is provided, regardless of where the several engines are located on the ship. Another object of my invention is to provide, for the foregoing as well as more general uses, an electric generator unit that will be accurately reliable and durably dependable in operation; that will not be subject to material change in its electrical characteristics either with age or when placed in the vicinity of an iron mass, and that will need only a minimum of upkeep-service. Other objects of my invention are to provide a generator-construction of small size and light weight as is especially desirable for aircraft use, that is at once very effective in operation, susceptible of manufacture at low cost, organized for ease of assembly and disassembly of its parts, and adequately constructed throughout to resist injury and to minimize wear.

To these ends, and for the attainment of other objects which will become apparent from the following disclosure, my invention consists in the novel combinations and features of construction hereinafter set forth and claimed.

In the accompanying drawings, wherein I have illustrated a single embodiment of my invention in a form that I have found in practice to be desirable, Fig. 1 is a longitudinal vertical section on a scale larger than full size through a device embodying the invention;

Figure 3:
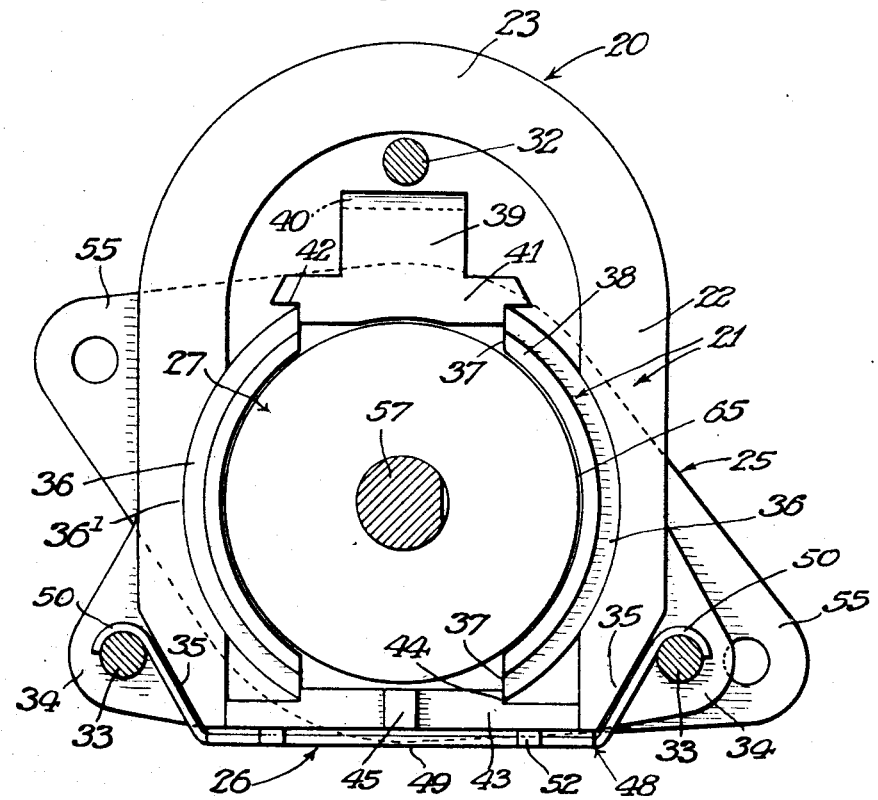
Fig. 3 is a transverse view on line 3—3 of Fig. 1, with parts in section and the armature diagrammatically indicated.

The particular generator-unit shown in the drawings is advantageously made up of separable sections, demountably assembled. The field-magnet section 20 (Fig. 1) characterized by the desirable employment of a single permanent field-magnet 21 of horseshoe shape, has the legs 22 and yoke 23 of the magnet arranged to form the mid-section of the generator frame or casing. End-caps 24 and 25, respectively forming the front and rear frame-members, abut against the front and rear sides of the field-section 20 to provide closed end sections of the frame or casing, and the foot-opening or lower end of the field sections is also suitably closed. Preferably this foot-opening receives a separate closure 26 which acts as a combined spacer and cover.

The rotor assembly 27 (Fig. 1), including the armature shaft with its armature and the commutator-drum, is supported by bearings in the two end caps. And a brush assembly 28 is demountably carried by the front end-cap.

The two end-caps, 24 and 25, are made of non-magnetic material, preferably as machined castings of light metal such as aluminum, although moldable non-metallic materials might be used.

The respective, confronting bases 30 and 31 of these end-caps are shaped consistently with the outline of the interposed field-magnet 21 and are clamped against the side-faces of the magnet as by top-bolt 32 and two bottom bolts 33, the former passing within the yoke of the magnet and the lower bolts uniting the base-ears 34 of the two end-caps and passing outside of the feet of the magnet, the heels of which are chamfered accommodatingly at 35 (Fig. 3.) The end caps are suitably ribbed, preferably, for re-enforcement of the bolt-receptive portions.

Preferably, the pole-shoes 36 for the two legs of the magnet are separately made and are freely demountable pieces making only surface contact with the magnet legs. They are firmly positioned against movement, however, by coaction with other parts in the organized assembly, which are, however, preferably removable parts that make only surface-contact with the pole shoes.

Figure 2:
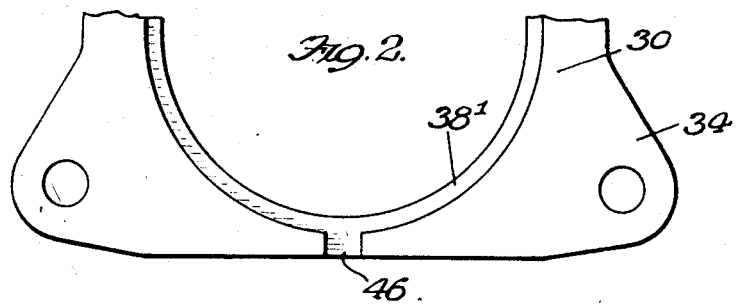
Fig. 2 is a detail of the front end-cap reversed to show its inner side.
Figure 6:
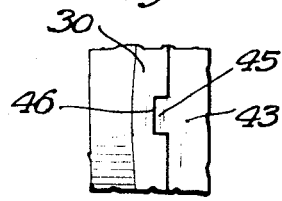
Fig. 6 is a bottom plan detail of the inter-lock between parts shown in Figs. 2 and 3.
Figure 4:
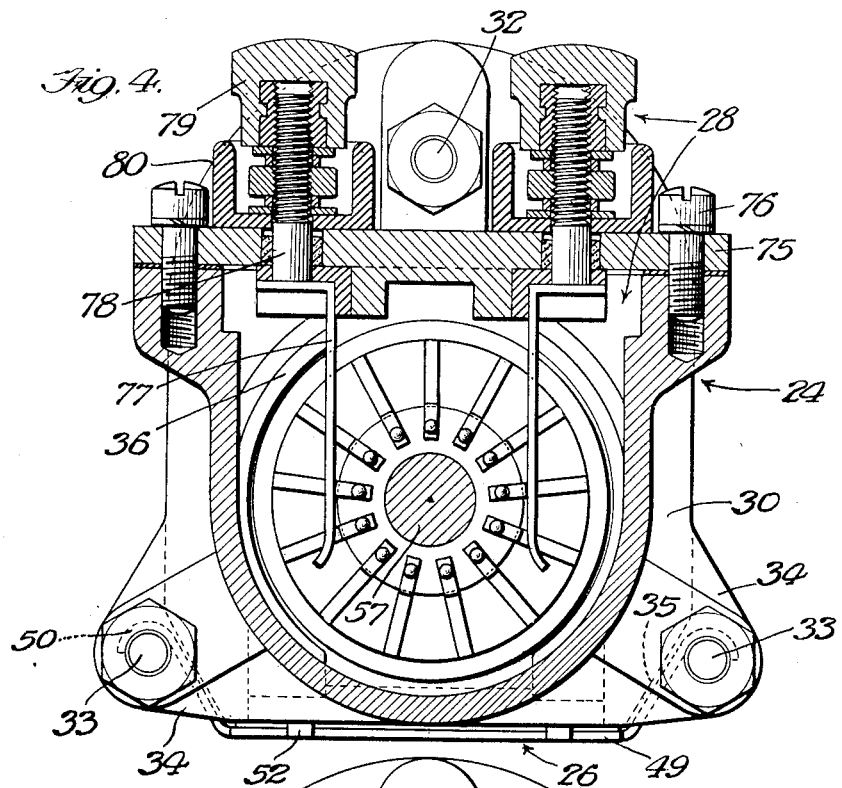
Fig. 4 is a cross-section on line 4—4 of Fig. 1.
Figure 5:
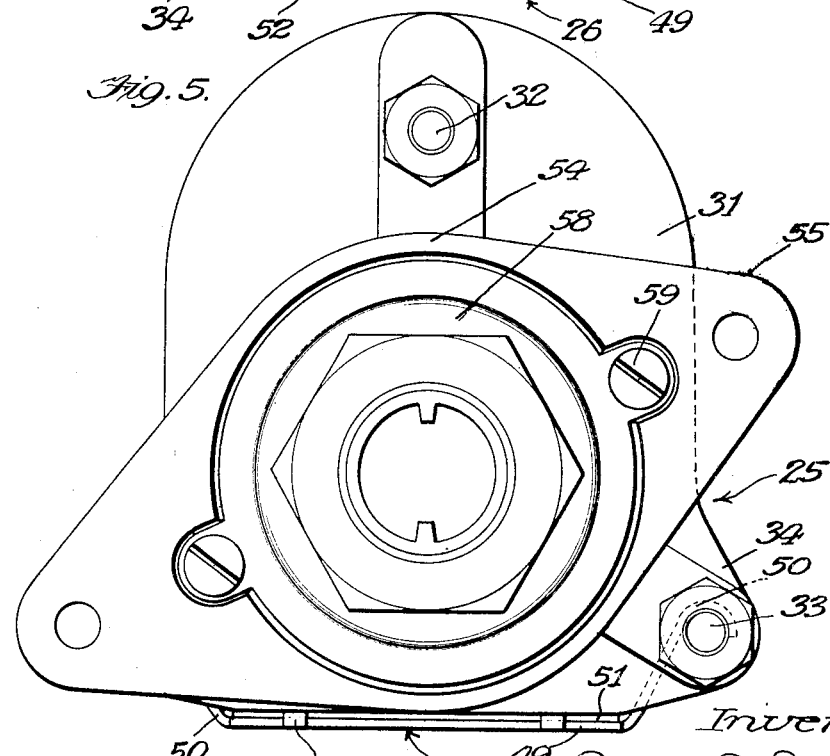
Fig. 5 is a rear view on line 5—5 of Fig. 1.

As herein shown, (Fig. 3) each pole-shoe 36 is arc-shaped in side view, with chord-cut ends 37 and with side-flanges 38 that project beyond the leg-width of the magnet; the legs 22 of the magnet being concavely formed as at 36' to receive the respective shoes, and the base-portions of the end-caps being recessed as at 38' (Fig. 2) to receive the flanges 38. The bases of the end-caps directly hold such shoes against sidewise displacement and indirectly act in positioning the shoes against rotary displacement, through cooperation with certain spacers.

The upper spacer 39, is here shown as a single-piece member, of brass or other non-magnetic material, arranged to bridge the gap between the upper ends 37 of the opposed shoes 36 and while it is freely detachable such member is immovably located in the assembly by coaction with other parts. Its longitudinal bar 40, in the form here shown, lies directly below the top bolt 32, and its down-turned ends, fitting snugly between the end-caps, provide a pair of spacing bars 41 which are notched at 42 for positioning surface-engagement with the ends of the opposed pole-shoes.

The detachable closure 26 for the foot of the field section, as herein shown, may be availed of to complete the fixed positioning of the pole-shoes and also for anchorage of the field-section against movement with respect to the end-caps. As here shown, such closure structure 26 includes a non-magnetic spacer-block 43, substantially filling the foot opening of the magnet, such block acting as a bottom spacer for the pole-shoes and also co-acting with an end-cap to interlock therewith against displacement. The block is shaped, as at 44, so that its top lift or boss is interposed between the bottom ends 37 of the pole-shoes, while its bottom portion, which passes below the pole shoes and gives bottom-support thereto, fits neatly between the ends of the magnet legs. An end-tongue 45 of the block engages a notch 46 in the adjacent end-cap 24.

Thus, by coaction, these freely demountable parts fixedly position each other, in assembly, and it will be observed that the construction does not require any perforating of the magnet to receive fastening devices nor does it require any assembly operations that would be detrimental to the magnet. The parts are individually simple, easy of manufacture, and readily assembled.

For detachably holding the block 43 against bodily removal, and completing the ensealing of the frame-portion of the generator against entrance of dust or moisture, I here provide combined structure 48 to these ends. Strap 49, passing under the block 43, has a body area larger in both directions than the foot opening of the magnet, and has lateral tongues 50 formed to extend snugly between ears 34 of the end-caps and hook over the bolt 33. A packing-piece 51, preferably made of insulating material and positioned on the body of the strap by marginal up-turned ears 52, serves both to seal the bottom of the casing and to space said strap away from possible contact with magnet 21. This strap may be of steel, for strength.

The rear end cap 25, has a tubular body 54 terminating in foot-lugs 55 adapted to be secured to the frame of the engine whose speed is to be metered, and its rear end is suitably shaped internally to receive the main ball bearing 56 for the armature shaft 57. A thin cover plate 58 is detachably secured, as by screws 59, to retain the ball bearing in place in its receptive seat 60, and the rear end of the armature shaft threadedly carries an externally flanged collar 61 packed as at 62 to make dustproof rotatable contact with said cover plate 54. The end of the armature shaft is splined or otherwise suitably shaped for demountable driven connection with a shaft 63 of the engine to be metered, as fragmentarily shown in Fig. 2, and the end-collar of the armature shaft is located within the end-counterbore 64 of the tubular shell.

The armature structure, generally indicated at 65 (Fig. 1), may be of any construction and winding commonly employed in shunt-wound generators and suitable for the intended electrical characteristics. For simplicity of illustration, I have therefore shown the armature and its commutator 66 quite diagrammatically.

The front end-cap 24, which is closed and substantially sealed at its forward end, has its front wall 70 shaped to afford a chamber 71 for the outboard ball-bearing 72 of the armature shaft. A plug 73 is snugly fitted around the shaft as an inner wall of this chamber so that bearing-lubricant supplied to the chamber through oiler 74 will not injuriously enter the main portion of the casing.

The brush assembly 28 is carried as a unit by a demountable casing-plate or carrier 75 secured, as by screws 76, to close a top-opening in the end-cap structure directly above the commutator drum. Opposed brushes 77 depend from the plate to coact with the commutator, each brush projecting from a stem 78 extending insulatedly through the cover plate 75 and threaded to receive the nuts 79 and the insulating guard-cup 80. It will be observed that removal of plate 75 detaches the entire brush structure from the frame and gives convenient access to the commutator drum for cleaning.

In operation I find that the generator above described, characteristically developing voltage directly proportional to armature speed, is very useful as the energizing medium for a tachometer of the volt-meter type, when electrically connected to the generator to indicate the speed of the associated engine, maintaining its accuracy in long use and practically regardless of proximity to iron masses in its environment.

It will be understood that while I have herein described in detail a particular embodiment of my invention for purposes of full disclosure of one practical and desirable utilization thereof, many changes may be made within the spirit of my invention and within the scope of the appended claims.

I claim:

1. Apparatus for engine-operation to develop electrical voltage proportional to the engine speed, comprising a permanent field-magnet having a foot-opening and forming a frame-section, non-magnetic front and rear end-caps secured together and embracing said field-magnet between them, an armature supported in said end-caps, and a non-magnetic spacer member forming a closure for the foot-opening of said field-magnet supported by said end-caps for holding said spacer member in place.

2. Apparatus to be engine-driven for developing electrical voltage proportional to the engine speed, comprising a permanent field-magnet forming an intermediate frame-section having an opening at the foot of said magnet, non-magnetic front and rear end-caps, uniting means clamping said end-caps upon the sides of said magnet, an armature rotatably mounted in said end-caps, and a non-magnetic spacer member forming a closure for the foot-opening of said magnet-section of the frame making positioning contact with the magnet, and means supported from said end-caps for holding said spacer member in place.

3. In an electrical device, apparatus to be engine-driven for developing electrical voltage proportional to the engine speed, including a permanent field-magnet forming an intermediate frame section and having a foot opening, non-magnetic front and rear end-caps having bases abutting the sides of the magnet, means uniting said bases in assembly fixing said field-magnet between said end-caps, an armature mounted in said end-caps, a closure for the foot-opening of said intermediate section, and means for retaining said closure removably in position, said means engaging said end-cap assembly.

4. In an electrical device, apparatus to be engine-driven for developing electrical voltage proportional to the engine speed, including a permanent field-magnet forming an intermediate frame section and having a foot opening, non-magnetic front and rear end-caps having bases abutting the sides of the magnet, tension means extraneous to the field magnet uniting said bases in an end-cap assembly clamping said field-magnet between said end-caps, an armature mounted in said end-caps, a closure for the foot-opening of said middle section, and means for retaining said closure removably in position comprising a retaining member engaging said end cap assembly.

5. In an electrical device, apparatus to be engine-driven for developing electrical voltage proportional to the engine speed, including a permanent field-magnet forming an intermediate frame section and having a foot opening, non-magnetic front and rear end-caps having bases abutting the sides of the magnet, bolts extraneous to the field magnet uniting said bases in an end-cap assembly clamping said field-magnet between said end-caps, an armature mounted in said end-caps, a closure for the foot-opening of said intermediate section, and means for retaining said closure removably in position comprising a retaining member engaging said bolts.

6. In an electrical device, apparatus to be engine-driven for developing electrical voltage proportional to the engine speed, including a permanent, horseshoe-shaped field-magnet forming an intermediate frame section and having a foot opening, non-magnetic front and rear end-caps having bases abutting and substantially conforming to the sides of the magnet, means including two bolts extraneous to the field magnet near the feet thereof uniting said bases in an end-cap assembly fixing said field-magnet between said end-caps, an armature mounted in said end-caps, a closure for the foot-opening of said intermediate section, and means for retaining said closure removably in position comprising a cross-strap engaging said end-cap-connecting bolts on opposite sides of the casing and passing under the intermediate portion of said casing.

7. In an electrical generating apparatus of the character described, the combination of a frame assembly including a permanent field-magnet forming an intermediate frame section and having a foot-opening, non-magnetic front and rear end-caps abutting the sides of said magnet section and demountably assembled therewith, freely demountable pole-shoes in surface contact with said magnet's legs above the open foot thereof, a non-magnetic spacer for the upper ends of said pole-shoes coacting with them and with the frame-assembly to fix their relative top positions, a spacer member coacting with the bottoms of said pole-shoes and with said frame-assembly for fixing the bottom positions thereof, and for closing the foot-opening, and a member supported by said end-caps for detachably holding said spacer member against bodily removal.

8. In a generator, the combination of a permanent magnet having a foot-opening and forming an intermediate frame-section, end-caps at the sides thereof and clamped thereagainst as part of the frame, separate freely-demountable pole-shoes making surface contact against the inner sides of the legs of said magnet above the foot-opening thereof, a non-magnetic spacer member interposed horizontally between the upper ends of said pole-shoes and vertically between the upper ends of said pole-shoes and the frame, a combined spacer and closure member supporting and spacing the lower ends of said pole-shoes and closing the foot-opening of the magnet-section of the frame, and means supported from said end-caps for demountably positioning said member in operative position.

9. In a generator, the combination of a permanent electromagnet having arcuate shoe-receptive surfaces on its opposed legs, and separate, arcuate pole-shoes arranged in surface contact only therewith, a top spacer-member of non-magnetic material having a lateral spacing portion between the confronting portions of the pole-shoes and a vertical spacing portion between the tops of the pole-shoes and the magnet yoke, a spacing structure at the bottom of said pole-shoes having a lateral spacing portion between their confronting surfaces and a supporting portion below said shoes, and an end-cap assembly including front and rear end-caps and connecting means therefor embracing the sides of said magnet structure and supporting said bottom spacer-structure.

10. In a generator, the combination of a permanent field-magnet forming an intermediate casing-member, end-caps demountably secured thereto, an armature structure mounted in said end-caps and having a commutator drum within one of them, said end-cap structure having an opening registering with said commutator drum, a substantially flat demountable closure plate for said opening, and a commutator-brush assembly carried by said closure, said commutator brush assembly including a plurality of brushes disposed substantially in parallelism and tangential to said commutator drum.

11. In a generator, the combination of a permanent field-magnet forming an intermediate casing-member, end-caps demountably secured thereto, an armature structure mounted in said end-caps and having a commutator drum within one of them, said end-cap structure having an opening registering with said commutator drum, a demountable closure for said opening, and a commutator brush assembly carried by said closure and including brushes interiorally projecting from said closure and binding-post assemblies on the outside of said closure electrically connected with said brushes.

12. In a generator, the combination of a frame comprising connected end-cap sections and an interposed field section that includes a permanent magnet open at its foot, an armature rotatably mounted in said end-cap sections and having a commutator drum within one of them, said end-cap section having an opening laterally registering with the commutator drum, a demountable closure for the foot-opening in the field section of said frame and a demountable closure for said lateral opening in said end-cap section of said frame.

13. In a generator, the combination of a frame comprising connected end-cap sections and an interposed field section that includes a permanent magnet open at its foot, an armature rotatably mounted in said end-cap sections and having a commutator drum within one of them, said end-cap section having an opening laterally registering with the commutator drum, a demountable closure for the foot-opening in the field section of said frame, a demountable closure for said opening in said end-cap section of said frame, and a commutator-brush assembly carried by and removable with said end-cap closure.

14. A machine of the class described having a frame including a central section and end-caps abutting its sides, a rotor structure journaled in said end-caps and having its shaft extended at one end through the end-portion of one of the caps, a cover plate secured to said end portion of said cap, and a packed collar on the shaft sealingly coacting with said cover plate to provide a closed dust-proof and oil-proof unitary structure.

15. In a machine, a frame comprising a central section, end-caps flanking it and fixed in relation thereto, a rotor structure having a shaft, an anti-friction bearing for the one end of said shaft, a second bearing for the other end of the shaft, the end wall of one of said end-caps being chambered to receive said second bearing, and a removable plug surrounding said shaft and closing said chamber off from the rest of the frame-interior to provide a closed dust-proof and oil-proof unitary structure.

16. A generator frame assembly comprising a permanent field magnet forming an intermediate frame section having separate pole-shoes making surface contact only with the magnet-legs, and means for holding said pole-shoes against sidewise displacement, said holding means comprising end cap members at opposite sides of said magnet, said end cap members having confronting bases shaped consistently with the outline of said field-magnet, and demountably assembled therewith.

17. In a generator, the combination of a permanent field magnet and an end cap demountably secured thereto, an armature structure mounted in said end cap and having a commutator drum therewithin, said end cap structure having an opening registering with said commutator drum, a demountable closure plate for said opening, and a commutator-brush assembly carried by said closure plate, said commutator brush assembly including a plurality of brushes disposed substantially in parallelism and tangential to said commutator drum.

18. In an electrical device, apparatus to be engine driven for developing electrical voltage proportional to the engine speed, including a permanent horse-shoe shaped field magnet forming an intermediate frame section and having a foot opening, non-magnetic front and rear end-caps having bases abutting and substantially conforming to the sides of the magnet, means including two bolts extraneous to the field magnet near the feet thereof uniting said bases in an end-cap assembly clamping said field magnet between said end-caps, an armature mounted in said end-caps, a closure for the foot opening of said intermediate section, and means for retaining said closure removable in position comprising a cross-strap engaging said end-cap connecting bolts on opposite sides of the casing and passing under the intermediate portion of said casing, and a packing on said strap sealing the joint-lines of said closure.

19. In an electrical device, apparatus to be engine driven for developing electrical voltage proportional to the engine speed, including a frame assembly comprising a permanent field magnet forming an intermediate frame section and having separate pole shoes making surface contact only with the magnet-legs, end-cap members at opposite sides of said magnet, said end-cap members having confronting bases shaped consistently with the outline of said field magnets, and demountably assembled therewith, and parts positioned by said frame assembly making only surface engagement with said pole shoes to position said pole shoes with respect to said magnet.

RAYMOND P. LANSING.